(12) United States Patent
Toriumi

(10) Patent No.: US 10,129,509 B2
(45) Date of Patent: Nov. 13, 2018

(54) IMAGING APPARATUS AND IMAGING METHOD

(71) Applicant: Sony Corporation, Tokyo (JP)

(72) Inventor: Yoichi Toriumi, Tokyo (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 15/305,890

(22) PCT Filed: May 1, 2015

(86) PCT No.: PCT/JP2015/063056
§ 371 (c)(1),
(2) Date: Oct. 21, 2016

(87) PCT Pub. No.: WO2015/174295
PCT Pub. Date: Nov. 19, 2015

(65) Prior Publication Data
US 2017/0054953 A1  Feb. 23, 2017

(30) Foreign Application Priority Data
May 14, 2014  (JP) ................................ 2014-100553

(51) Int. Cl.
*H04N 9/083* (2006.01)
*H04N 9/04* (2006.01)
(Continued)

(52) U.S. Cl.
CPC ............. *H04N 9/04* (2013.01); *G02B 26/008* (2013.01); *G03B 11/00* (2013.01); *H04N 5/2254* (2013.01);
(Continued)

(58) Field of Classification Search
CPC ...... H04N 5/23212; H04N 9/07; H04N 9/045; H04N 11/00; H04N 9/04; H04N 5/2254; G01J 3/51
See application file for complete search history.

(56) References Cited

U.S. PATENT DOCUMENTS 5,355,234 A     10/1994  Kim
2013/0038782 A1*  2/2013  Fish ..................... H04N 5/2254
                                                            348/360

FOREIGN PATENT DOCUMENTS

| JP | 64-074522 A | 3/1989 |
| JP | 6-038224 A  | 2/1994 |
| JP | 7-095358 A  | 4/1995 |

\* cited by examiner

*Primary Examiner* — Sinh Tran
*Assistant Examiner* — Selam Gebriel
(74) *Attorney, Agent, or Firm* — Wolf, Greenfield & Sacks, P.C.

(57) ABSTRACT

An imaging apparatus and method for multi-spectral imaging is described. The imaging apparatus includes an imaging element that takes an image of a subject, a multi-spectral filter that has a plurality of spectral filters dispersing incident light on the imaging element by predetermined wavelength regions, and a drive unit that drives the multi-spectral filter without stopping the individual spectral filters and continuously switches the spectral filters to cover an opening in the imaging element. The imaging apparatus detects whether a boundary between adjacent ones of the plurality of spectral filters included in the multi-spectral filter is in a position to block the opening in the imaging element, and performs signal processing for invalidating an image output from the imaging element in a period in which it is detected that the boundary between the spectral filters is in the position to block the opening in the imaging element.

20 Claims, 10 Drawing Sheets

(51) Int. Cl.
*G03B 11/00* (2006.01)
*G02B 26/00* (2006.01)
*H04N 5/225* (2006.01)
*H04N 5/235* (2006.01)
*H04N 5/232* (2006.01)
*H04N 5/243* (2006.01)

(52) U.S. Cl.
CPC ......... *H04N 5/2256* (2013.01); *H04N 5/2352* (2013.01); *H04N 5/2353* (2013.01); *H04N 5/23212* (2013.01); *H04N 5/243* (2013.01); *H04N 2209/043* (2013.01)

IMAGING APPARATUS AND IMAGING METHOD

TECHNICAL FIELD

The present disclosure relates to an imaging apparatus and an imaging method, more specifically, to an imaging apparatus and an imaging method that allow multi-spectral images to be taken at high speeds and in a reliable manner.

BACKGROUND ART

In general, a solid-state imaging element is configured such that color filters of three primary colors, red, green, and blue are arranged for each pixel in a Bayer array, for example. In addition, in the solid-state imaging element, the pixels receive light of respective colors split by the color filters to take an image of three primary colors.

Meanwhile, for example, there has been developed an imaging apparatus in which pixels receive split light of more colors than the three primary colors to take a plurality of images of respective colors (hereinafter, called multi-spectral images as appropriate).

For example, conventionally, the imaging apparatuses capable of taking multi-spectral images are configured such that a plurality of spectral filters is switched to take multi-spectral images, and stopping the spectral filters and taking an image with each switching between the individual spectral filters are repeated to take a set of multi-spectral images in a time-division manner.

As described above, the conventional imaging apparatuses are configured to repeat switching and stopping the spectral filters, which makes it hard to take a set of multi-spectral images in a short time (for example, about one second). Therefore, when a long time takes to take a set of multi-spectral images (for example, about several seconds), moving objects such as tree branches swinging in the wind, for example, may not align with each other between the set of multi-spectral images. A composite of the multi-spectral images will appear blurred.

In contrast to this, Patent Document 1 discloses an imaging apparatus that takes a set of multi-spectral images in a time-division manner without stoppage of individual spectral filters so that the multi-spectral images can be taken at high speeds. In this imaging apparatus, markings of boundaries between the spectral filters are detected from the taken images and the image data is allocated.

CITATION LIST

Patent Document

Patent Document 1: Japanese Patent Application Laid-Open No. 2003-309856

SUMMARY OF THE INVENTION

Problems to be Solved by the Invention

However, in the imaging apparatus in which markings of boundaries between the multi-spectral filters are detected from the images, it is difficult to obtain focus because the spectral filters are positioned near an imaging element. In addition, light volume may be insufficient because the spectral filters are inside a mirror cylinder. Accordingly, the markings of boundaries between the spectral filters may not be detected properly, thereby making it difficult to take the multi-spectral images in a reliable manner.

The present disclosure is devised in light of the foregoing circumstances. An objective of the present invention is to allow multi-spectral images to be taken at high speeds and in a reliable manner.

Solutions to Problems

An imaging apparatus according to one aspect of the present disclosure includes: an imaging element that takes an image of a subject; a multi-spectral filter that has a plurality of spectral filters that disperses incident light on the imaging element by predetermined wavelength regions; a drive unit that drives the multi-spectral filter without stopping the individual spectral filters and continuously switches the spectral filters to cover an opening in the imaging element; a boundary detection unit that detects whether a boundary between adjacent ones of the plurality of spectral filters included in the multi-spectral filter is in a position to block the opening in the imaging element; and a signal processing unit that performs signal processing for invalidating an image output from the imaging element in a period in which the boundary detection unit detects that the boundary between the spectral filters is in the position to block the opening in the imaging element.

An imaging method according to one aspect of the present disclosure is an imaging method by an imaging apparatus including an imaging element that takes an image of a subject, a multi-spectral filter that has a plurality of spectral filters that disperses incident light on the imaging element by predetermined wavelength regions, and a drive unit that drives the multi-spectral filter without stopping the individual spectral filters and continuously switches the spectral filters to cover an opening in the imaging element, wherein the imaging method includes the steps of: detecting whether a boundary between adjacent ones of the plurality of spectral filters included in the multi-spectral filter is in a position to block the opening in the imaging element; and performing signal processing for invalidating an image output from the imaging element in a period in which it is detected that the boundary between the spectral filters is in the position to block the opening in the imaging element.

In one aspect of the present disclosure, whether a boundary between adjacent ones of the plurality of spectral filters included in the multi-spectral filter is in a position to block the opening in the imaging element is detected; and signal processing for invalidating an image output from the imaging element in a period in which it is detected that the boundary between the spectral filters is in the position to block the opening in the imaging element is performed.

Effects of the Invention

According to one aspect of the present disclosure, it is possible to take the multi-spectral images at high speeds and in a reliable manner.

MODE FOR CARRYING OUT THE INVENTION

Specific embodiments to which the present technology is applied will be explained below in detail with reference to the drawings.

Figure 1:
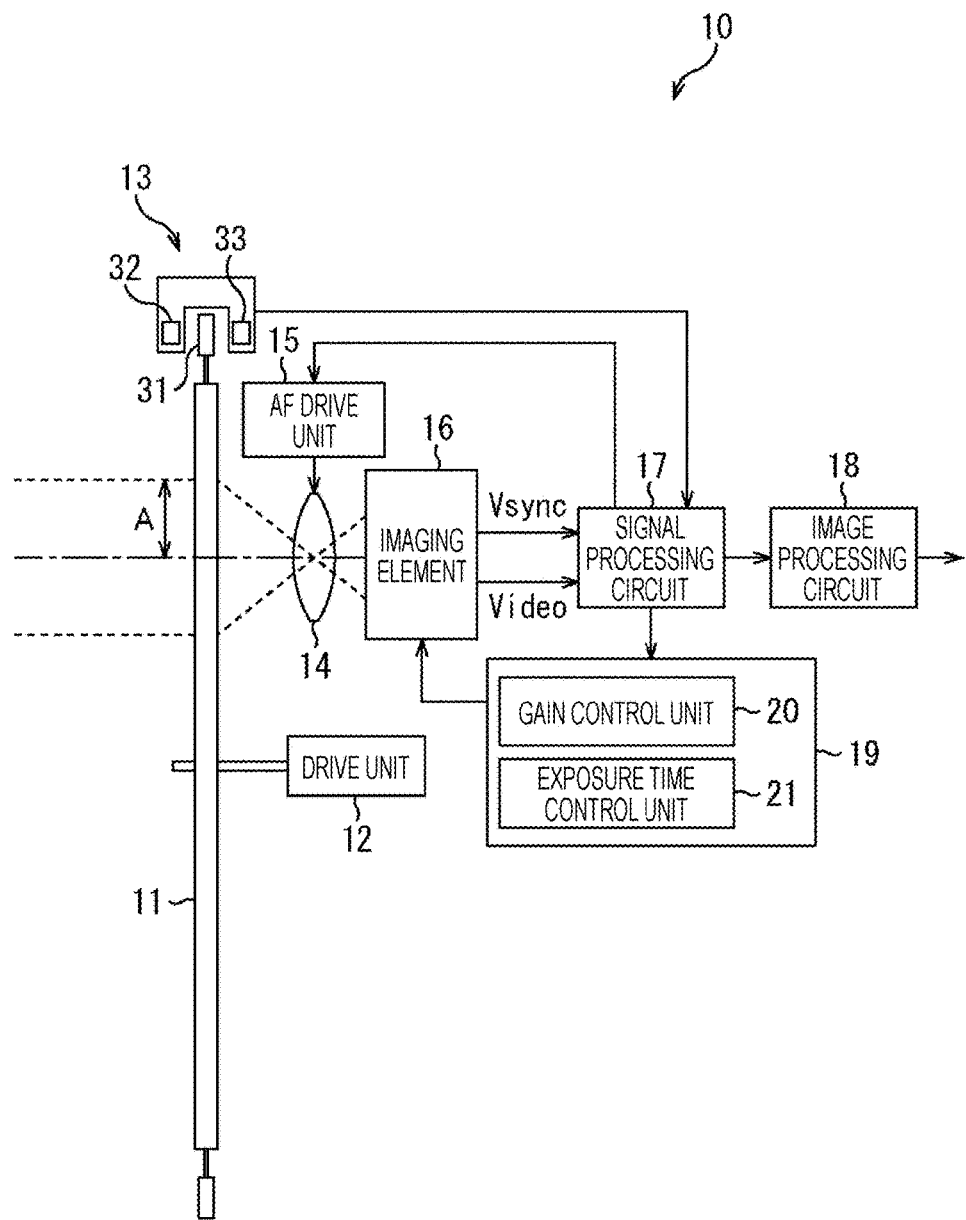
FIG. 1 is a block diagram of a configuration example of an embodiment of an imaging apparatus to which the present technology is applied.

FIG. 1 is a block diagram of a configuration example of an embodiment of an imaging apparatus to which the present technology is applied.

As illustrated in FIG. 1, an imaging apparatus 10 includes a multi-spectral filter 11, a drive unit 12, a boundary detection unit 13, a focus optical system 14, an auto focus (AF) drive unit 15, an imaging element 16, a signal processing circuit 17, an image processing circuit 18, and an imaging condition setting unit 19.

Figure 2:
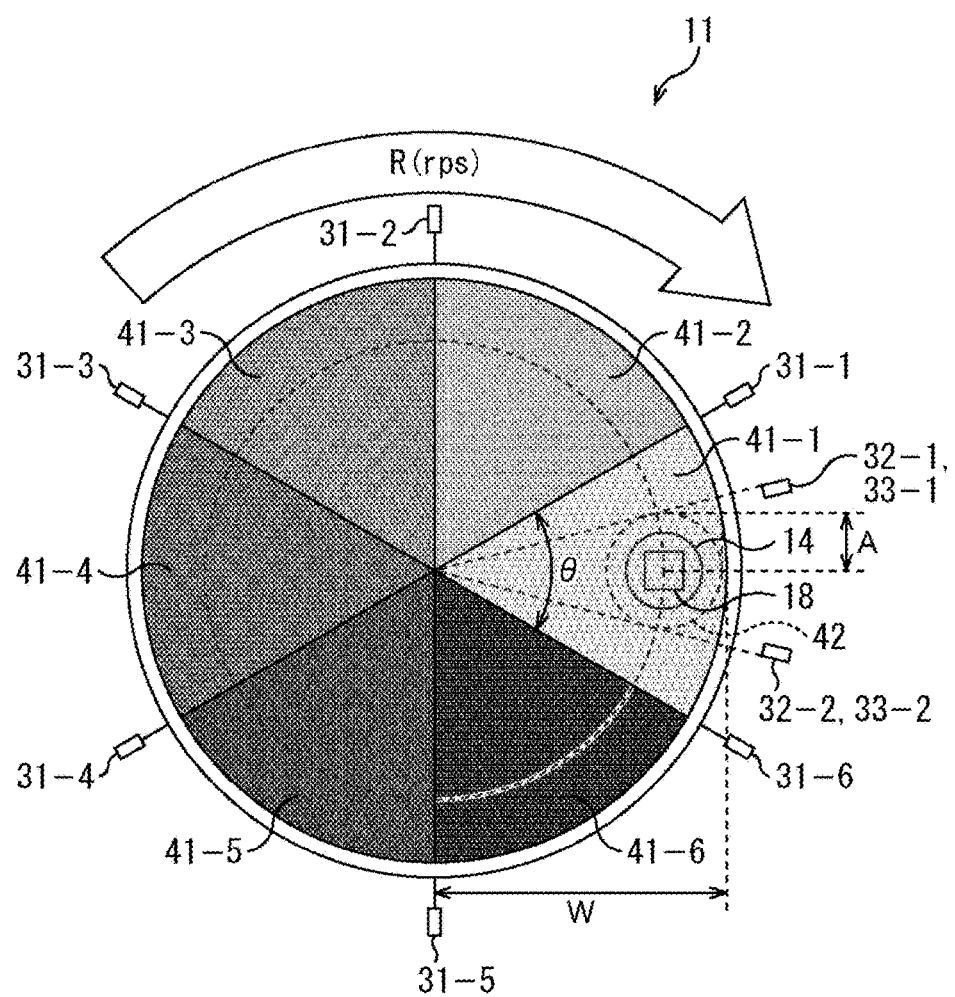
FIG. 2 is a diagram illustrating a configuration example of a multi-spectral filter.

The multi-spectral filter 11 has a plurality of optical filters that disperses incident light on the imaging element 16 by predetermined wavelength region. In addition, the multi-spectral filter 11 is driven by the drive unit 12 such that the optical filter covering the opening in the imaging element 16 can be continuously switched in sequence without stopping the individual optical filters. For example, the multi-spectral filter 11 is configured to form a disc-shaped plane by six optical filters 41-1 to 41-6 as illustrated in FIG. 2 described later. The optical filters 41-1 to 41-6 are arranged in sequence in a rotation direction with a rotation axis on the center of the disc.

The drive unit 12 is a motor rotationally driven around a rotation shaft. The rotation shaft is attached to the center of the multi-spectral filter 11 to rotate the multi-spectral filter 11 at a specific rotation speed. In this manner, when the drive unit 12 rotates the multi-spectral filter 11, the optical filters 41-1 to 41-6 are sequentially switched and arranged in the position to cover the opening in the imaging element 16.

The boundary detection unit 13 detects whether the boundaries between the adjacent ones of the optical filters 41-1 to 41-6 included in the multi-spectral filter 11 is in the position to block the opening in the imaging element 16 over the multi-spectral filter 11. In addition, the boundary detection unit 13 outputs a boundary detection signal indicating whether the boundaries between the optical filters 41-1 to 41-6 are in the position to block the opening in the imaging element 16. For example, the boundary detection unit 13 may be configured such that a plurality of light-shielding plates 31 rotating together with the multi-spectral filter 11, fixed light-emitting element 32 and light-receiving element 33 are combined, and the light-shielding plates 31 pass through the light-emitting element 32 and the light-receiving element 33.

The focus optical system 14 is configured by combining a plurality of lenses, and collects incident light from a subject via the multi-spectral filter 11 and forms an image of the subject in focus on a sensor surface of the imaging element 16.

The AF drive unit 15 drives the lenses constituting the focus optical system 14 on the basis of the contrast of the image taken by the imaging element 16, for example, such that the image surface of the subject formed by the focus optical system 14 aligns with the sensor surface of the imaging element 16. In addition, the AF drive unit 15 performs a control to stop AF driving of the focus optical system 14 in accordance with an AF control signal supplied from the signal processing circuit 17.

The imaging element 16 takes an image of a subject not illustrated via the multi-spectral filter 11. Specifically, the imaging element 16 receives light from the subject via the multi-spectral filter 11, and supplies to the signal processing circuit 17 an image signal of the image formed by pixel signals in accordance with the amount of light received by pixels arranged on the sensor surface. In addition, the imaging element 16 can take images continuously at a predetermined frame rate, and supplies to the signal processing circuit 17 a vertical synchronization signal Vsync in synchronization with the frame rate.

The signal processing circuit 17 determines whether the image signals supplied from the imaging element 16 are valid or invalid on the basis of the boundary detection signal supplied from the boundary detection unit 13 and the vertical synchronization signal Vsync supplied from the imaging element 16.

For example, the signal processing circuit 17 determines that the image taken on the basis of the vertical synchronization signal Vsync in the period in which the boundary detection signal indicates that the boundaries between the optical filters 41-1 to 41-6 are in a position to block the opening in the imaging element 16 is invalid. Meanwhile, the signal processing circuit 17 determines that the image taken on the basis of the vertical synchronization signal Vsync in the period in which the boundaries between the optical filters 41-1 to 41-6 is not in the position to block the opening in the imaging element 16 is valid. Incidentally, in the following description, as appropriate, the period in which the boundaries between the optical filters 41-1 to 41-6 are in the position to block the opening in the imaging element 16 will be called invalid period, and the period in which the boundaries between the optical filters 41-1 to 41-6 are not in the position to block the opening in the imaging element 16 will be called valid period.

Then, the signal processing circuit 17 invalidates the images determined as invalid and supplies only an image signal of the image determined as valid to the image processing circuit 18. In addition, the imaging element 16 supplies an AF control signal for switching between the valid period and the invalid period to the AF drive unit 15 at a timing similar to the boundary detection signal. Similarly, the imaging element 16 supplies an imaging timing signal for switching between the valid period and the invalid period to the imaging condition setting unit 19.

The image processing circuit 18 performs various image processing operations such as white balance adjustment and gamma correction on the image signal supplied from the signal processing circuit 17, and outputs the same to a block at a subsequent stage not illustrated.

The imaging condition setting unit 19 sets imaging conditions such that a plurality of images taken by the imaging element 16 in the valid period is changed for each frame, for example, in accordance with the imaging timing signal supplied from the signal processing circuit 17. For example, the imaging condition setting unit 19 has a gain control unit 20 and an exposure time control unit 21. The gain control unit 20 sets a plurality of gains for each frame such that the gains are changed for each frame of the images taken by the imaging element 16 in the valid period. In addition, the exposure time control unit 21 sets a plurality of exposure times for each frame such that the exposure times are changed for each frame of the images taken by the imaging element 16 in the valid period.

In the thus configured imaging apparatus 10, the optical filters 41-1 to 41-6 positioned to cover the opening in the imaging element 16 are switched continuously without stoppage, and only the images in which no boundaries between the optical filters 41-1 to 41-6 are seen are output. Therefore, the imaging apparatus 10 can take multi-spectral images dispersed by the optical filters 41-1 to 41-6 at high speeds and in a reliable manner.

For example, the imaging apparatus 10 can take a set of multi-spectral images corresponding to all the optical filters 41-1 to 41-6 in a time-division manner in as a short time as about one second. Accordingly, as for a set of multi-spectral images of a moving object with a time constant of about several seconds such as tree branches swinging in the wind, for example, the moving object can be aligned without appearing blurred in a composite of the multi-spectral images. In addition, the imaging apparatus 10 is simply configured such that the multi-spectral filter 11 is rotationally driven by the drive unit 12. Accordingly, the imaging apparatus 10 is high in optomechanical reliability and can be easily maintained in quality.

Next, referring to FIG. 2, a configuration example of the multi-spectral filter 11 will be explained.

FIG. 2 illustrates the multi-spectral filter 11 seen from the direction of the rotation axis. A hollow arrow in FIG. 2 indicates the rotation direction of the multi-spectral filter 11.

As illustrated in FIG. 2, the multi-spectral filter 11 is configured to form a disc-shaped plane by the six optical filters 41-1 to 41-6. The optical filters 41-1 to 41-6 are arranged in point symmetry with respect to the center of the disc. Therefore, the multi-spectral filter 11 is configured to be rotated by the drive unit 12 in the rotation direction around the center of the disc of the multi-spectral filter 11 as rotation axis so that the optical filters 41-1 to 41-6 cover in sequence an opening 42 in the imaging element 16 over the multi-spectral filter 11.

In addition, six light-shielding plates 31-1 to 31-6 are attached to the outer periphery of the multi-spectral filter 11 at positions extended outward from the boundaries between the adjacent optical filters 41-1 to 41-6. For example, the light-shielding plate 31-1 is attached at the boundary between the optical filters 41-1 and 41-2, and the light-shielding plate 31-2 is attached at the boundary between the optical filters 41-2 and 41-3. Similarly, the light-shielding plate 31-6 is attached at boundary between the optical filters 41-6 and 41-1.

In addition, the light-emitting element 32 and the light-receiving element 33 constituting the boundary detection unit 13 together with the light-shielding plates 31-1 to 31-6 are provided at two sites as illustrated in FIG. 2. Specifically, a light-emitting element 32-1 and a light-receiving element 33-1 are arranged at a site that contacts one of two tangent lines extending from the center of rotation of the multi-spectral filter 11 and contacting the opening 42, on which a boundary between the optical filters 41-1 to 41-6 starts to block the opening when the multi-spectral filter 11 rotates in the rotation direction. Meanwhile, a light-emitting element 32-2 and a light-receiving element 33-2 are arranged at a site that contacts one of the two tangent lines extending from the center of rotation of the multi-spectral filter 11 and contacting the opening 42, on which a boundary between the optical filters 41-1 to 41-6 completely blocks the opening when the multi-spectral filter 11 rotates in the rotation direction.

According to the foregoing configuration, when any one of the light-shielding plates 31-1 to 31-6 passes between the light-emitting element 32-1 and the light-receiving element 33-1, there occurs a timing when the light emitted from the light-emitting element 32-1 is not received by the light-receiving element 33-1. Similarly, when any one of the light-shielding plates 31-1 to 31-6 passes between the light-emitting element 32-2 and the light-receiving element 33-2, there occurs a timing when the light emitted from the light-emitting element 32-2 is not received by the light-receiving element 33-2.

Therefore, it is possible to detect that any one of the boundaries between the optical filters 41-1 to 41-6 is in the position to block the opening in the imaging element 16 from the timing when the light-receiving element 33-1 does not receive the light from the light-emitting element 32-1 to the timing when the light-receiving element 33-2 does not receive the light from the light-emitting element 32-2.

The boundary detection unit 13 is thus configured to detect the boundaries between the optical filters 41-1 to 41-6, whereby the imaging apparatus 10 can detect the boundaries in a more reliable manner as compared to the configuration in which the boundaries are detected from the images taken by the imaging element 16, for example. Therefore, it is possible to invalidate reliably the images in which the boundaries between the optical filters 41-1 to 41-6 are seen even though the optical filters 41-1 to 41-6 are continuously switched without stoppage.

Design formulas for designing the multi-spectral filter 11 and a method for deciding numeric values necessary for the design formulas will be explained.

For example, radius A of the opening 42 in the imaging element 16 over the multi-spectral filter 11 is determined by the specifications for the imaging element 16. In addition, central angle θ of one optical filter 41 (θ=60° in the example of FIG. 2) is determined by number N of the optical filters 41 included in the multi-spectral filter 11 (N=6 in the example of FIG. 2). In addition, minimum radius W of the multi-spectral filter 11 is determined by setting the ratio (E:D) between a valid period E in which the boundaries between the optical filters 41 are not in the position to block the opening 42, and an invalid period D in which the boundaries between the optical filters 41 are in the position to block the opening 42.

Therefore, the central angle θ of one optical filter 41 can be designed in accordance with the following formula (1):

[Mathematical Formula 1]

$$\theta = 2 \cdot \tan\left(\frac{E+D}{D} \cdot \frac{A}{W-A}\right) = \frac{2\pi}{N} \tag{1}$$

Further, the number N of the optical filters 41, the valid period E, and the invalid period D are known, and the frame rate F of the imaging element 16 is also known. Therefore, as shown in the following formula (2), maximum rotation speed R (rps) of the multi-spectral filter 11 can be determined in accordance with the number of frames f taken by the imaging element 16 in the valid period E.

[Mathematical Formula 2]

$$f = \frac{F/R}{N} \cdot \frac{E}{E+D} \quad (2)$$

It is concluded by the formula (2) that the time necessary for obtaining one spectral image is 1/R. The numeric values in the equations (1) and (2) may be determined by tracing back with the conclusion as a condition.

In addition, the arrangement sequence of the optical filters 41-1 to 41-6 in the multi-spectral filter 11 can be set in accordance with wavelength characteristics (ascending or descending sequence of transmission band wavelengths). This suppresses significant changes in displacements of wavelength aberrations (color aberrations) of the optical filters 41 continuous in the valid periods E with the invalid periods D therebetween. Therefore, immediately after the resumption of the valid period E, for example, the AF drive unit 15 can adjust focus on the subject easily (quickly) due to smaller changes in the wavelength aberrations.

Next, a process by the signal processing circuit 17 will be explained with reference to FIG. 3.

As described above, the boundary detection unit 13 supplies to the signal processing circuit 17 a boundary detection signal indicating whether a boundary between the optical filters 41-1 to 41-6 is in the position to block the opening in the imaging element 16.

Figure 3:
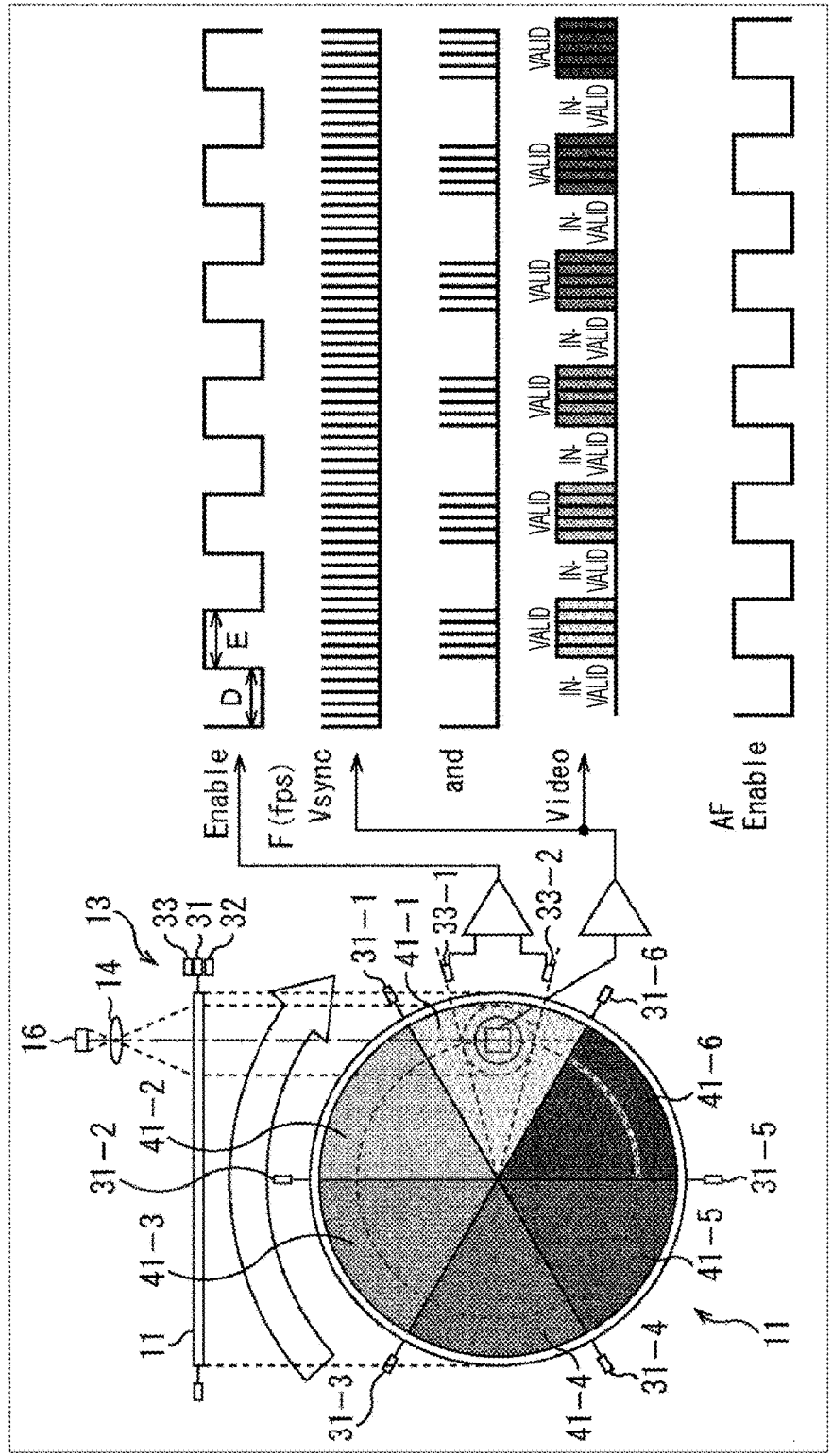
FIG. 3 is a diagram describing a process by a signal processing circuit.

The boundary detection unit 13 outputs a boundary detection signal that is in high level in the valid periods E in which the opening in the imaging element 16 is not blocked and is in low level in the invalid periods D in which the opening in the imaging element 16 is blocked, as illustrated in the top stage of the right side of FIG. 3, for example. That is, the boundary detection unit 13 switches the boundary detection signal to low level at a timing when any one of the light-shielding plates 31-1 to 31-6 has passed between the light-emitting element 32-1 and the light-receiving element 33-1, and the light-receiving element 33-1 has not detected light from the light-emitting element 32-1. In addition, the boundary detection unit 13 also switches the boundary detection signal to high level at a timing any one of the light-shielding plates 31-1 to 31-6 has passed between the light-emitting element 32-2 and the light-receiving element 33-2, and the light-receiving element 33-2 has not detected light from the light-emitting element 32-2.

In addition, besides the boundary detection signal, the imaging element 16 supplies to the signal processing circuit 17 vertical synchronization signals Vsync as illustrated in the second stage of the right side of FIG. 3.

Therefore, the signal processing circuit 17 ANDs the boundary detection signal and the vertical synchronization signals Vsync to determine only the vertical synchronization signals Vsync in the valid periods E in which the boundary detection signal is in high level is valid, as illustrated in the third stage of right side of FIG. 3. Then, the signal processing circuit 17 outputs to the image processing circuit 18 only the images taken in accordance with the vertical synchronization signals Vsync determined as valid, as illustrated in the fourth stage of right side of FIG. 3. That is, the images taken in accordance with the vertical synchronization signals Vsync in the invalid periods Din which the boundary detection signal is in low level are invalidated.

In addition, the signal processing circuit 17 supplies to the AF drive unit 15 an AF control signal for switching the signal level according to the valid periods and the invalid periods of the images in synchronization with the vertical synchronization signals Vsync, as illustrated in the fifth top stages of right side of FIG. 3. In addition, in accordance with the AF control signal, the AF drive unit 15 performs a control to execute AF driving only for the valid periods of the images and stop the AF driving for the invalid periods of the images. At that time, the AF drive unit 15 can maintain AF settings immediately before the invalid period of the image so that the subject can be focused from the frame immediately after the resumption of the valid period of the image.

Figure 4:
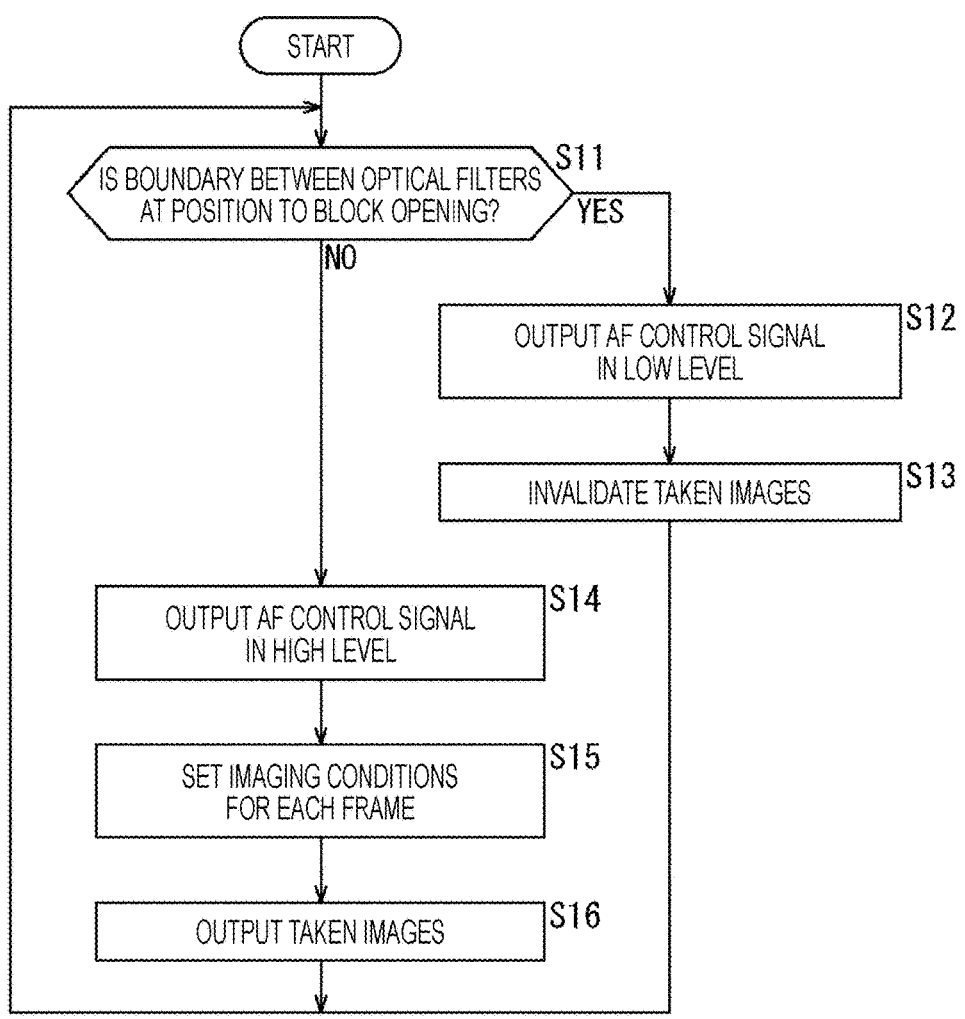
FIG. 4 is a flowchart of a process performed in an imaging apparatus.

Next, FIG. 4 is a flowchart of a process performed in the imaging apparatus 10.

For example, the process starts when the imaging apparatus 10 is powered on to bring the imaging element 16 into the state that is capable of imaging and rotate the multi-spectral filter 11 at a specific rotation speed. At step S11, the signal processing circuit 17 determines whether a boundary between the optical filters 41-1 to 41-6 is in the position to block the opening in the imaging element 16 in accordance with the boundary detection signal supplied from the boundary detection unit 13.

At step S11, when the boundary detection signal is in low level, the signal processing circuit 17 determines that a boundary between the optical filters 41-1 to 41-6 is in the position to block the opening in the imaging element 16, and the process moves to step S12.

At step S12, the signal processing circuit 17 outputs the AF control signal in low level and stops AF driving of the focus optical system 14 by the AF drive unit 15, and at step S13, invalidates the images taken by the imaging element 16.

Meanwhile, at step S11, when the boundary detection signal is in high level, the signal processing circuit 17 determines that no boundary between the optical filters 41-1 to 41-6 is in the position to block the opening in the imaging element 16, and the process moves to step S14.

At step S14, the signal processing circuit 17 outputs the AF control signal in high level, and causes the AF drive unit 15 to perform AF driving of the focus optical system 14. In addition, at step S15, the signal processing circuit 17 controls the imaging condition setting unit 19 to set imaging conditions for each frame, the gain control unit 20 sets gain for each frame, and the exposure time control unit 21 sets exposure time for each frame.

Then, at step S16, the signal processing circuit 17 determines the images taken by the imaging element 16 as valid, that is, the signal processing circuit 17 determines that no boundary between the optical filters 41-1 to 41-6 is seen in the images taken by the imaging element 16, and outputs the images to the image processing circuit 18.

After step S13 or S16, the process returns to step S11 to repeat similar operations.

Figure 5:
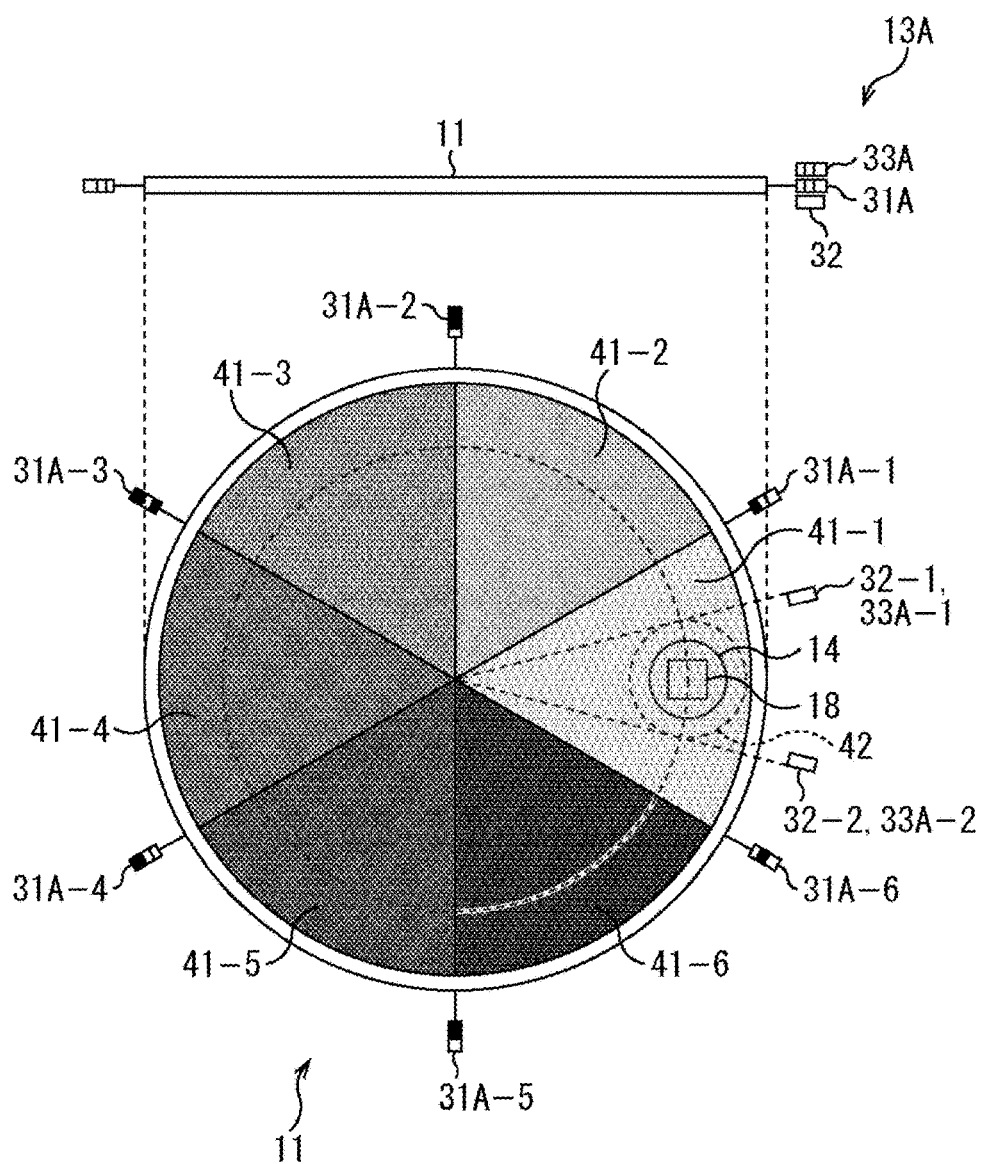
FIG. 5 is a diagram of a first modification example of a boundary detection unit.

Next, FIG. 5 is a diagram of a first modification example of the boundary detection unit 13.

As illustrated in FIG. 5, a boundary detection unit 13A is configured by combining light-shielding plates 31A-1 to 31A-6, the light-emitting element 32, and a light-receiving element 33A.

The light-shielding plates 31A-1 to 31A-6 are attached to the outer periphery of the multi-spectral filter 11 in an arrangement corresponding to the boundaries between the optical filters 41-1 to 41-6, as with the light-shielding plates 31-1 to 31-6 illustrated in FIG. 2. In addition, the light-shielding plates 31A-1 to 31A-6 have light-shielding positions split into three in the radius direction of the multi-spectral filter 11, and are coded by the three light-shielding positions. That is, the light-shielding plates 31A-1 to 31A-6 can be identified by varying the light-shielding positions of the light-shielding plates 31A-1 to 31A-6.

In addition, the light-receiving element 33A has a light-receiving position split in correspondence with the three light-shielding positions of the light-shielding plates 31A-1 to 31A-6.

In the thus configured boundary detection unit 13A, the light-receiving element 33A receives light at the split light-receiving positions to detect individually the light-shielding plates 31A-1 to 31A-6.

For example, the light-shielding plates 31A-1 is arranged at the boundary between the optical filters 41-1 and 41-2. When the multi-spectral filter 11 is rotated in the rotation direction to detect the light-shielding plates 31A-1, then the optical filter 41-2 blocks the opening. Similarly, when the boundary in light-shielding plates 31A-2 is detected, then the optical filter 41-3 blocks the opening, and when the boundary of the light-shielding plate 31A-3 is detected, then the optical filter 41-4 blocks the opening.

As described above, the boundary detection unit 13A can detect individually the light-shielding plates 31A-1 to 31A-6, and supply individual boundary detection signals to the signal processing circuit 17. Accordingly, the signal processing circuit 17 can recognize individually the light-shielding plates 31A-1 to 31A-6, and recognize the next corresponding optical filters 41-1 to 41-6.

Therefore, the signal processing circuit 17 notifies the recognized next optical filter 41 to the AF drive unit 15, and the AF drive unit 15 can predict AF operation in accordance with the characteristics of the notified next optical filter 41. Accordingly, the AF drive unit 15 can resume AF driving for the frame immediately after the resumption of the valid period E, and obtain focus on the subject in accordance with the prediction.

Figure 6:
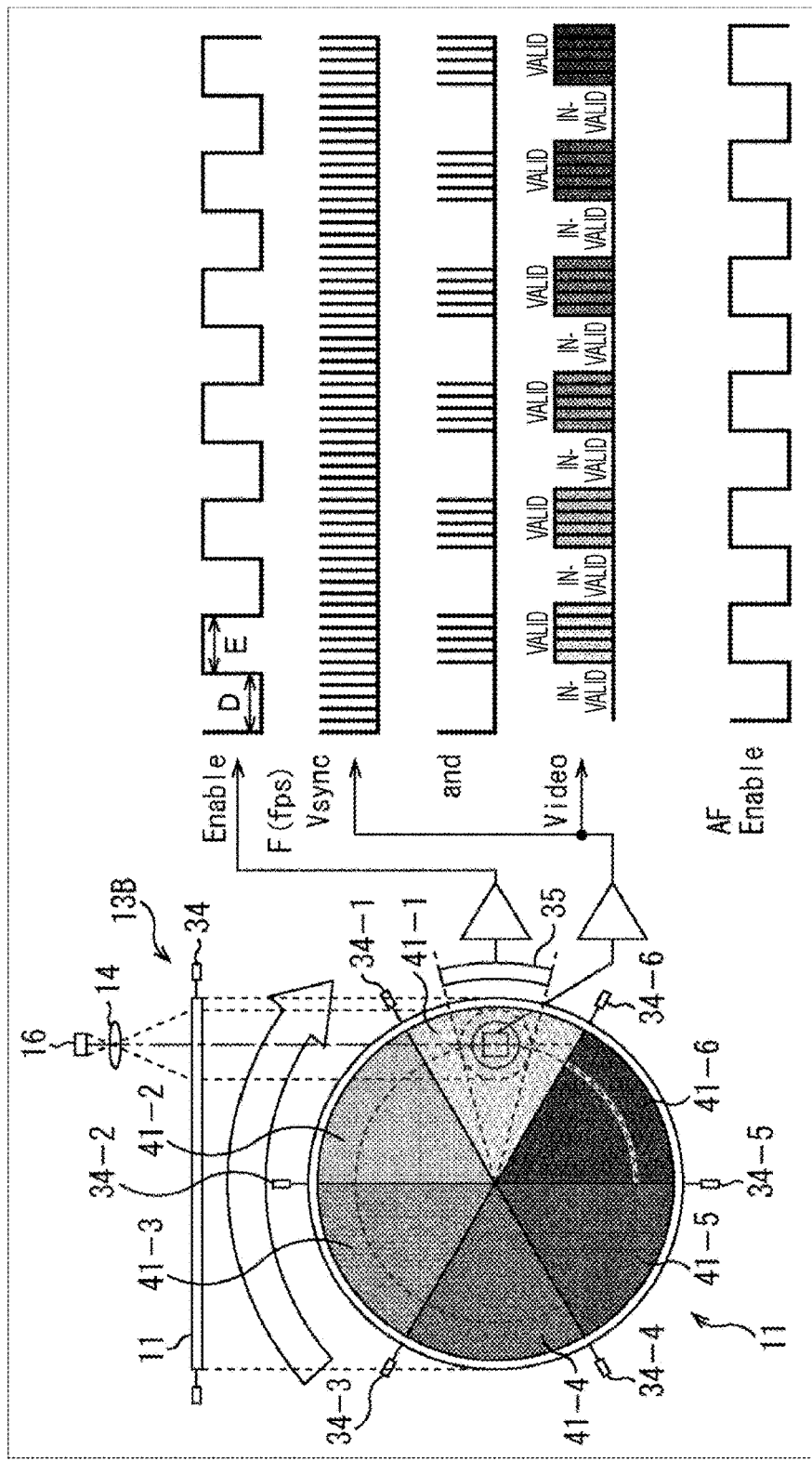
FIG. 6 is a diagram of a second modification example of the boundary detection unit.

Next, FIG. 6 is a diagram of a second modification example of the boundary detection unit 13.

As illustrated in FIG. 6, a boundary detection unit 13B is configured by combining rotation electrodes 34-1 to 34-6 and a fixed electrode 35.

The rotation electrodes 34-1 to 34-6 are attached to the outer periphery of the multi-spectral filter 11 as with the light-shielding plates 31A-1 to 31A-6 illustrated in FIG. 2. The fixed electrode 35 is provided in a range between two tangent lines extending from the center of rotation of the multi-spectral filter 11 and contacting the opening 42.

Therefore, in the period during which any one of the light-shielding plates 31A-1 to 31A-6 is in contact with the fixed electrode 35, the boundary detection unit 13B can detect that a boundary between the optical filters 41-1 to 41-6 is in the position to block the opening 42.

Figure 7:
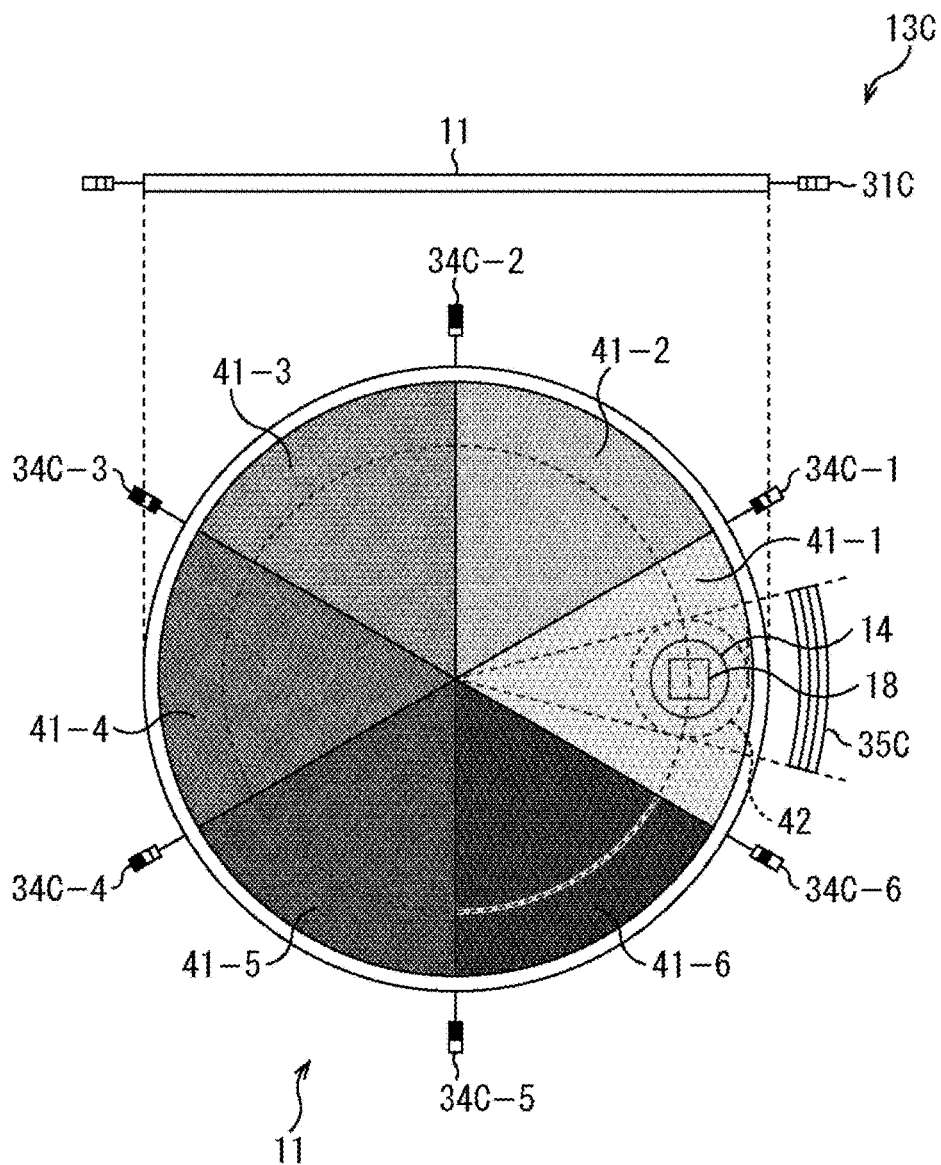
FIG. 7 is a diagram of a third modification example of the boundary detection unit.

Next, FIG. 7 is a diagram of a third modification example of the boundary detection unit 13.

As illustrated in FIG. 7, a boundary detection unit 13C is configured by combining rotation electrodes 34C-1 to 34C-6 and a fixed electrode 35C.

The rotation electrodes 34C-1 to 34C-6 are coded by three split positions in contact with the fixed electrode 35C, as with the light-shielding plates 31A-1 to 31A-6 illustrated in FIG. 5. That is, the rotation electrodes 34C-1 to 34C-6 can be identified by varying the contact positions of the rotation electrodes 34C-1 to 34C-6.

The fixed electrode 35C is split in correspondence with the three contact positions of the rotation electrodes 34C-1 to 34C-6.

The thus configured boundary detection unit 13C can detect individually the rotation electrodes 34C-1 to 34C-6 by the fixed electrode 35C contacting the rotation electrodes 34C-1 to 34C-6 at the split contact positions as with the boundary detection unit 13A illustrated in FIG. 5. Therefore, the signal processing circuit 17 can recognize individually the rotation electrodes 34C-1 to 34C-6, and recognize individually the next corresponding optical filters 41-1 to 41-6. Accordingly, as described above with reference to FIG. 5, the AF drive unit 15 can predict AF operation in accordance with the characteristics of the next optical filters 41 and obtain focus on the subject in accordance with the prediction immediately after the resumption of the valid period E.

Next, a process for taking a set of spectral images in a time-division manner will be explained with reference to FIG. 8.

Figure 8:
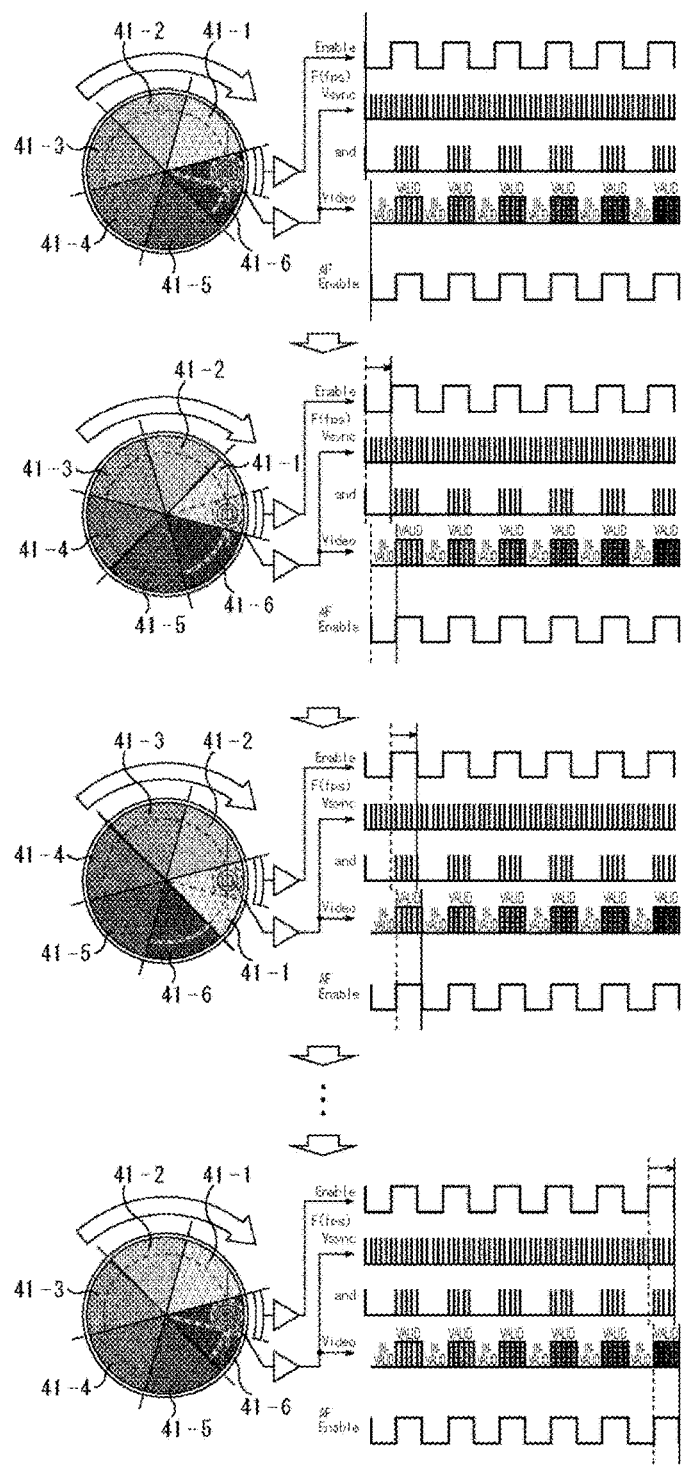
FIG. 8 is a diagram describing a process of taking a set of multi-spectral images in a time-division manner.

First, as illustrated in the top stage of FIG. 8, the boundary detection signal is turned into low level and the invalid period D is started at a timing when it is detected that the boundary between the optical filters 41-6 and 41-1 is in a position to start to block the opening. Then, as illustrated in the second stage of FIG. 8, the boundary detection signal is turned into high level and the invalid period D is ended at a timing when it is detected that the boundary between the optical filters 41-6 and 41-1 is in a position to block completely the opening, and then taking of the image dispersed by the optical filter 41-1 is started. After that, as illustrated in the third stage of FIG. 8, the boundary detection signal is turned into low level and the valid period E is ended at a timing when it is detected that the boundary between the optical filters 41-1 and 41-2 is in the position to start to block the opening.

Similarly, the subsequent processing is repeated. As illustrated in the fourth stage of FIG. 8, at a timing when it is detected that the boundary between the optical filters 41-6 and 41-1 starts to block the opening, the valid period E is ended and taking of the image dispersed by the optical filter 41-6 is ended. Accordingly, a set of multi-spectral images, that is, the six multi-spectral images corresponding to the optical filters 41-1 to 41-6 can be taken.

In addition, in the valid periods during which the multi-spectral images corresponding to the optical filters 41-1 to 41-6 are taken, the gain and exposure time of the imaging element 16 are changed for each frame. For example, high gain is set for a dark section in the image and short exposure time is set for a bright section in the image. Accordingly, it is possible to obtain appropriate resolution in each pixel of the bright section of the subject and appropriate resolution in each pixel of the dark section of the subject. In particular, setting the short exposure time can prevent shining, saturation, and the like in the pixels of the blight section of the subject. Then, the image processing circuit 18 performs image processing to extract appropriately the bright section or the dark section of the subject from a plurality of valid frames obtained from the optical filters 41-1 to 41-6 and composite the extracted sections, thereby acquiring all the spectral images of appropriate brightness on the whole. Therefore, the imaging apparatus 10 is more suitable for use in an environment in which the subject is likely to be high in contrast under indoor and outdoor fixed point observation (monitoring), for example.

Incidentally, the timing for switching between the valid period and the invalid period and the vertical synchronization signal Vsync indicating the timing for each frame imaging may be designed to be synchronized or may not be necessarily synchronized. That is, even though they are not in synchronization, the signal processing circuit 17 can determine the images in the valid period as being valid and output the same.

In addition, the imaging apparatus 10 may be configured to drive rotationally the multi-spectral filter 11 in a continuous manner only to take a set of multi-spectral images, or may be configured to drive rotationally the multi-spectral filter 11 in a continuous manner from the instant when the imaging element 16 enters into the state that is capable of imaging (the standby state in which imaging is yet to be performed). In addition, the imaging apparatus 10 may be configured to drive rotationally the multi-spectral filter 11 in a continuous manner at any time under fixed point observation (monitoring) or the like, thereby to switch between the optical filters 41-1 to 41-6.

Figure 9:
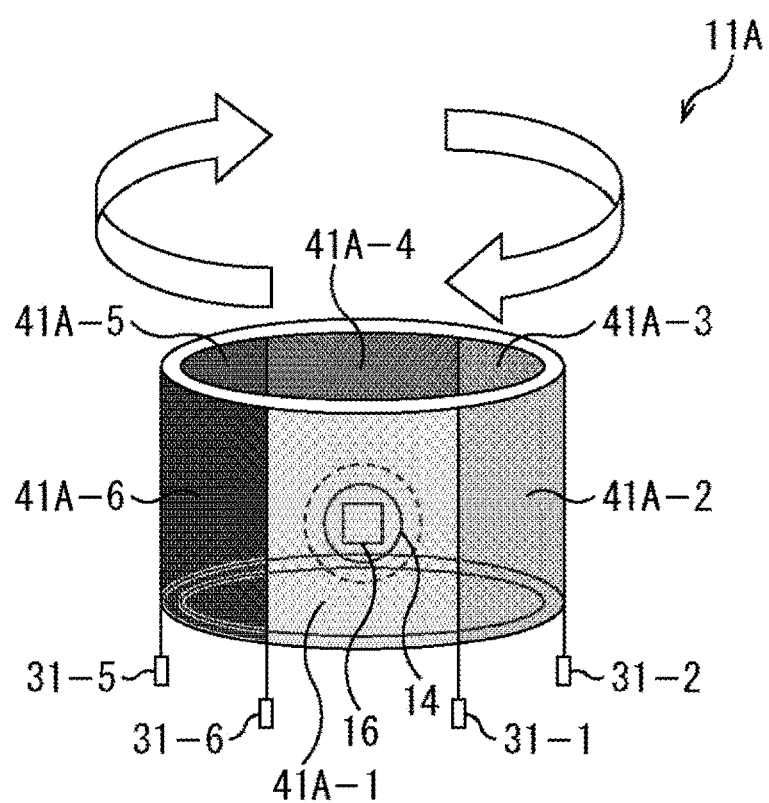
FIG. 9 is a diagram of a first modification example of the multi-spectral filter.

Next, FIG. 9 is a diagram of a first modification example of the multi-spectral filter 11.

As illustrated in FIG. 9, the imaging apparatus 10 may have a cylinder-shaped multi-spectral filter 11A.

The multi-spectral filter 11A is configured such that six optical filters 41A-1 to 41A-6 form a cylindrical side surface, and is rotationally driven in the rotation direction with the center of the cylinder as a rotation axis. Accordingly, the optical filters 41A-1 to 41A-6 arranged on the side surface of the cylinder cover sequentially the opening in the imaging element 16.

In addition, the six light-shielding plates 31-1 to 31-6 are attached to the lower end of the multi-spectral filter 11A at sites extended downward along the boundaries between the optical filters 41A-1 to 41A-6. Accordingly, in a manner similar to that described above with reference to FIG. 2, the boundary detection unit 13 configured by combining the fixed light-emitting element 32 and light-receiving element 33 can detect the boundaries between the optical filters 41A-1 to 41A-6.

Figure 10:
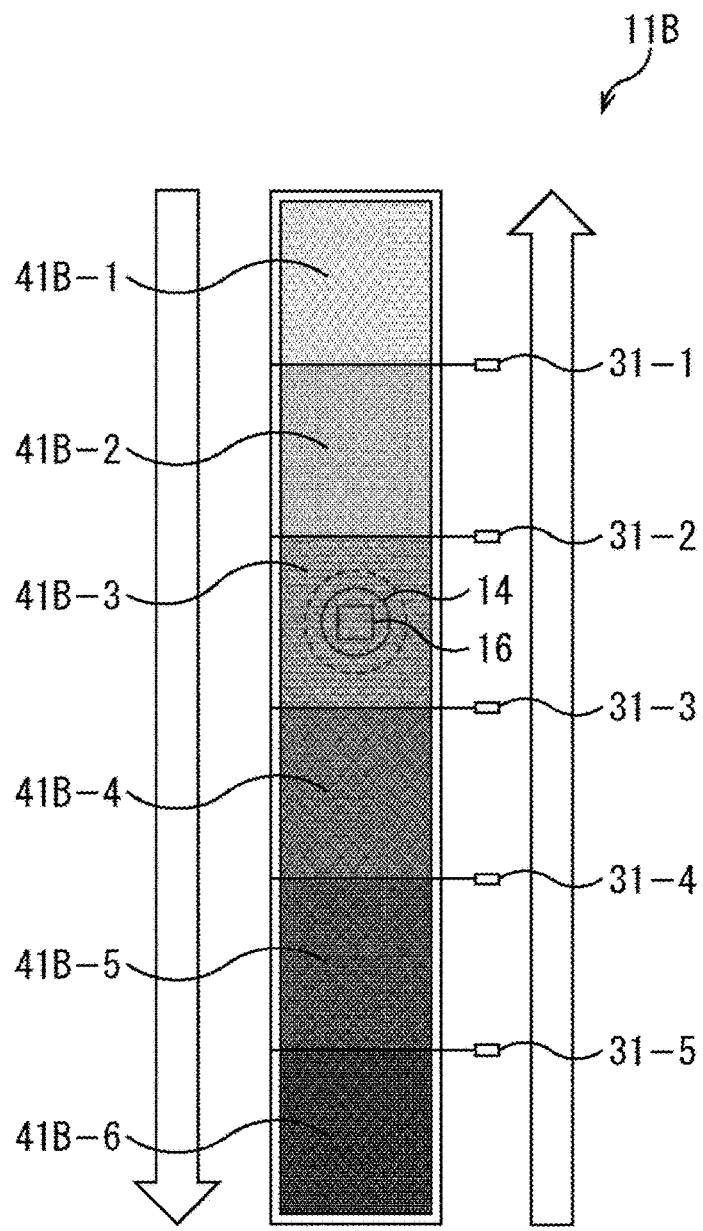
FIG. 10 is a diagram of a second modification example of the multi-spectral filter.

Next, FIG. 10 is a diagram of a second modification example of the multi-spectral filter 11.

As illustrated in FIG. 10, the imaging apparatus 10 can have a rectangular multi-spectral filter 11B.

The multi-spectral filter 11B is configured such that six almost square optical filters 41B-1 to 41B-6 form a narrow rectangular plane. The optical filters 41B-1 to 41B-6 are arranged in sequence in a linear direction in which the optical filters 41B-1 to 41B-6 are driven to reciprocate along the longitudinal side of the rectangle. Accordingly, the optical filters 41B-1 to 41B-6 are configured to cover in sequence the opening in the imaging element 16. At that time, in the configuration with the multi-spectral filter 11B, a drive means with a direct-acting mechanism is necessary, not a rotationally driving motor.

In addition, the five light-shielding plates 31-1 to 31-5 are attached to the right end of the multi-spectral filter 11B at sites extended downward along the boundaries between the optical filters 41B-1 to 41B-6. Accordingly, in a manner similar to that described above with reference to FIG. 2, the boundary detection unit 13 configured by combining the fixed light-emitting element 32 and light-receiving element 33 can detect the boundaries between the optical filters 41B-1 to 41B-6.

Incidentally, the series of operations described above can be executed by hardware or software. In the case of executing the series of operations by software, a program constituting the software is installed via a program recording medium into a computer incorporated into dedicated hardware or a general-purpose personal computer capable of executing various functions by installing various programs, for example.

In the computer, programs stored in a read only memory (ROM), programs stored in a storage unit composed of a hard disc or a non-volatile memory are loaded into a random access memory (RAM), and executed by a central processing unit (CPU). Accordingly, the series of operations described above are carried out.

In addition, these programs can be stored in advance in the storage unit or can be installed into the computer via a communication unit composed of a network interface or via a drive driving removable media such as magnetic discs (including flexible discs), optical discs (compact disc read only memories (CD-ROMs), digital versatile discs, (DVDs)) and others), magneto-optical discs, or semiconductor memories.

Incidentally, the programs executed in the computer may be programs in which operations are performed in a time-series manner in the order described herein, or programs in which the operations are performed in parallel or at necessary timings such as when a call is made. In addition, the programs may be processed by one CPU or may be subjected to distributed processing by a plurality of CPUs.

Incidentally, the present technology may also be configured as follows:

(1)

An imaging apparatus including:

an imaging element that takes an image of a subject;

a multi-spectral filter that has a plurality of spectral filters that disperses incident light on the imaging element by predetermined wavelength regions;

a drive unit that drives the multi-spectral filter without stopping the individual spectral filters and continuously switches the spectral filters to cover an opening in the imaging element;

a boundary detection unit that detects whether a boundary between adjacent ones of the plurality of spectral filters included in the multi-spectral filter is in a position to block the opening in the imaging element; and a signal processing unit that performs signal processing for invalidating an image output from the imaging element in a period in which the boundary detection unit detects that the boundary between the spectral filters is in the position to block the opening in the imaging element.

(2)

The imaging apparatus according to (1), wherein the boundary detection unit is configured by combining a plurality of light-shielding plates attached to positions corresponding to the boundaries in the multi-spectral filter and a light-emitting element and a light-receiving element that are fixed in accordance with the opening in the imaging element.

(3)

The imaging apparatus according to (1) or (2), wherein the boundary detection unit has a first light-emitting element and a first light-receiving element that are arranged on an extension of the boundary in the multi-spectral filter that is in a position to start to block the opening in the imaging element, and a second light-emitting element and a second light-receiving element that are arranged on an extension of the boundary in the multi-spectral filter in a position to block completely the opening in the imaging element, and the boundary detection unit detects that the boundary is in the position to block the opening in the imaging element in a period from a timing when the light-shielding plate passes between the first light-emitting element and the first light-receiving element to a timing when the light-shielding plate passes through the second light-emitting element and the second light-receiving element.

(4)

The imaging apparatus according to (1), wherein the boundary detection unit is configured by combining a plurality of moving electrodes attached to positions corresponding to the boundaries in the multi-spectral filter and a fixed electrode fixed in correspondence with the opening in the imaging element.

(5)

The imaging apparatus according to (1) or (4), wherein the fixed electrode is arranged in a range from the extension of the boundary in the position where the boundary in the multi-spectral filter starts to block the opening in the imaging element to the extension of the boundary in the position where the boundary in the multi-spectral filter blocks completely the opening in the imaging element, and the boundary detection unit detects that the boundary is in the position to block the opening in the imaging element in a period in which the moving electrodes are in contact with the fixed electrode.

(6)

The imaging apparatus according to any of (1) to (5), further including an AF drive unit that performs auto-focus (AF) driving of an optical system such that light from a subject irradiated by the imaging element comes into focus, wherein the AF drive unit stops AF driving when images output from the imaging element are invalidated by the signal processing unit, maintains AF settings immediately before the stoppage, and starts AF driving immediately after images output from the imaging element are determined as valid by the signal processing unit.

(7)

The imaging apparatus according to any of (1) to (6), wherein the spectral filters are arranged in the multi-spectral filter in the sequence according to the wavelength characteristics of the plurality of spectral filters.

(8)

The imaging apparatus according to (6) or (7), wherein the boundary detection unit detects wavelength characteristics of the next spectral filters in accordance with the rotation direction of the multi-spectral filter, the AF drive unit predicts AF operation to be started immediately after images output from the imaging element are determined as valid by the signal processing unit, on the basis of the wavelength characteristics detected by the boundary detection unit.

(9)

The imaging apparatus according to (8), wherein the boundary detection unit includes a moving electrode arranged in the multi-spectral filter and a fixed electrode arranged in the position of the opening in the imaging element, and the moving electrode and the fixed electrode are split into a plurality of pieces, and the moving electrodes are configured to be identifiable by varying respective contact positions of the moving electrodes.

(10)

The imaging apparatus according to (8), wherein the boundary detection unit includes a light-shielding plate arranged in the multi-spectral filter and a combination of a light source and a detection element arranged in the position of the opening in the imaging element, the light-shielding plate and the detection element are split into a plurality of pieces, and the light-shielding plates are configured to be identifiable by varying respective light-shielding positions of the light-shielding plates.

(11)

The imaging apparatus according to any of (1) to (10), further including a gain control unit that changes a gain of the imaging element for a plurality of valid frames imaged by the imaging element for the plurality of spectral filters.

(12)

The imaging apparatus according to any of (1) to (11), further including an exposure time control unit that changes an exposure time of the imaging element for a plurality of valid frames imaged by the imaging element for the plurality of spectral filters.

(13)

The imaging apparatus according to any of (1) to (12), further including an image processing unit that extracts a bright section and a dark section from a plurality of valid frames imaged by the imaging element for the plurality of spectral filters.

(14)

The imaging apparatus according to any of (1) to (13), wherein the multi-spectral filter has a disc shape in which the plurality of spectral filters is arranged in sequence on a plane of the disc in a rotation direction with the center of the disc as a rotation axis.

(15)

The imaging apparatus according to (14), wherein a frame rate F and an opening radius A of the imaging element, a radius W and a rotation speed R of the multi-spectral filter, the number N of the spectral filters included in the multi-spectral filter, a central angle θ with a peak on the center of the disc of the spectral filters, the ratio between a valid period D in which the image is determined as valid by the signal processing unit and an invalid period E in which the image is invalidated by the signal processing unit, and the number of frames f of the image taken in the valid period D are in relations described in equations (1) and (2) as follows:

[Mathematical Formula 1]

$$\theta = 2 \cdot \tan\left(\frac{E+D}{D} \cdot \frac{A}{W-A}\right) = \frac{2\pi}{N} \quad (1)$$

[Mathematical Formula 2]

$$f = \frac{F/R}{N} \cdot \frac{E}{E+D} \quad (2)$$

(16)

The imaging apparatus according to any of (1) to (13), wherein the plurality of spectral filters has a cylindrical shape in which the spectral filters are arranged in sequence on a side surface of the cylinder in a rotation direction with the center of the cylinder as a rotation axis.

(17)

The imaging apparatus according to any of (1) to (13), wherein the plurality of spectral filters has a rectangular shape in which the spectral filters are arranged in sequence on a plane of the narrow rectangle in a linear direction that reciprocates along a longitudinal side of the rectangle.

(18)

The imaging apparatus according to any of (1) to (17), wherein the drive unit drives the multi-spectral filter to switch continuously the spectral filters when images of light having passed through the plurality of optical filters are taken by the imaging element in a time-division manner.

(19)

The imaging apparatus according to any of (1) to (17), wherein the drive unit drives the multi-spectral filter to switch continuously the spectral filters at anytime or when the imaging element enters into the state that is capable of imaging.

(20)

An imaging method by an imaging apparatus including an imaging element that takes an image of a subject, a multi-spectral filter that has a plurality of spectral filters that disperses incident light on the imaging element by predetermined wavelength regions, and a drive unit that drives the multi-spectral filter without stopping the individual spectral filters and continuously switches the spectral filters to cover an opening in the imaging element, wherein the imaging method includes the steps of:

detecting whether a boundary between adjacent ones of the plurality of spectral filters included in the multi-spectral filter is in a position to block the opening in the imaging element; and performing signal processing for invalidating an image output from the imaging element in a period in which it is detected that the boundary between the spectral filters is in the position to block the opening in the imaging element.

Incidentally, the embodiment of the present disclosure is not limited to the one described above but can be changed in various manners without deviating from the gist of the present disclosure.

REFERENCE SIGNS LIST

10 Imaging apparatus
11 Multi-spectral filter
12 Drive unit
13 Boundary detection unit
14 Focus optical system
15 AF drive unit
16 Imaging element
17 Signal processing circuit
18 Image processing circuit
19 Imaging condition setting unit
20 Gain control unit
21 Exposure time control unit
31-1 to 31-6 Light-shielding plate
32 Light-emitting element
33 Light-receiving element
34 Moving electrode
35 Fixed electrode
41-1 to 41-6 Optical filter
42 Opening

The invention claimed is:

1. An imaging apparatus comprising:
an imaging element that takes an image of a subject;
a multi-spectral filter that has a plurality of spectral filters that disperses incident light on the imaging element by predetermined wavelength regions;
a drive unit that drives the multi-spectral filter without stopping the individual spectral filters and continuously switches the spectral filters to cover an opening in the imaging element;
a boundary detection unit that detects whether a boundary between adjacent ones of the plurality of spectral filters included in the multi-spectral filter is in a position to block the opening in the imaging element; and
a signal processing unit that performs signal processing for invalidating an image output from the imaging element in a period in which the boundary detection unit detects that the boundary between the spectral filters is in the position to block the opening in the imaging element.

2. The imaging apparatus according to claim 1, wherein the boundary detection unit is configured by combining a plurality of light-shielding plates attached to positions corresponding to the boundaries in the multi-spectral filter and a light-emitting element and a light-receiving element that are fixed in accordance with the opening in the imaging element.

3. The imaging apparatus according to claim 2, wherein the boundary detection unit has a first light-emitting element and a first light-receiving element that are arranged on an extension of the boundary in the multi-spectral filter that is in a position to start to block the opening in the imaging element, and a second light-emitting element and a second light-receiving element that are arranged on an extension of the boundary in the multi-spectral filter in a position to block completely the opening in the imaging element, and the boundary detection unit detects that the boundary is in the position to block the opening in the imaging element in a period from a timing when the light-shielding plate passes between the first light-emitting element and the first light-receiving element to a timing when the light-shielding plate passes through the second light-emitting element and the second light-receiving element.

4. The imaging apparatus according to claim 1, wherein the boundary detection unit is configured by combining a plurality of moving electrodes attached to positions corresponding to the boundaries in the multi-spectral filter and a fixed electrode fixed in correspondence with the opening in the imaging element.

5. The imaging apparatus according to claim 4, wherein the fixed electrode is arranged in a range from the extension of the boundary in the position where the boundary in the multi-spectral filter starts to block the opening in the imaging element to the extension of the boundary in the position where the boundary in the multi-spectral filter blocks completely the opening in the imaging element, and the boundary detection unit detects that the boundary is in the position to block the opening in the imaging element in a period in which the moving electrodes are in contact with the fixed electrode.

6. The imaging apparatus according to claim 1, further comprising an AF drive unit that performs auto-focus (AF) driving of an optical system such that light from a subject irradiated by the imaging element comes into focus, wherein the AF drive unit stops AF driving when images output from the imaging element are invalidated by the signal processing unit, maintains AF settings immediately before the stoppage, and starts AF driving immediately after images output from the imaging element are determined as valid by the signal processing unit.

7. The imaging apparatus according to claim 6, wherein the spectral filters are arranged in the multi-spectral filter in the sequence according to the wavelength characteristics of the plurality of spectral filters.

8. The imaging apparatus according to claim 6, wherein the boundary detection unit detects wavelength characteristics of the next spectral filters in accordance with the rotation direction of the multi-spectral filter, the AF drive unit predicts AF operation to be started immediately after images output from the imaging element are determined as valid by the signal processing unit, on the basis of the wavelength characteristics detected by the boundary detection unit.

9. The imaging apparatus according to claim 8, wherein the boundary detection unit includes a moving electrode arranged in the multi-spectral filter and a fixed electrode arranged in the position of the opening in the imaging element, and the moving electrode and the fixed electrode are split into a plurality of pieces, and the moving electrodes are configured to be identifiable by varying respective contact positions of the moving electrodes.

10. The imaging apparatus according to claim 8, wherein the boundary detection unit includes a light-shielding plate arranged in the multi-spectral filter and a combination of a light source and a detection element arranged in the position of the opening in the imaging element, the light-shielding plate and the detection element are split into a plurality of pieces, and the light-shielding plates are configured to be identifiable by varying respective light-shielding positions of the light-shielding plates.

11. The imaging apparatus according to claim 1, further comprising a gain control unit that changes a gain of the imaging element for a plurality of valid frames imaged by the imaging element for the plurality of spectral filters.

12. The imaging apparatus according to claim 1, further comprising an exposure time control unit that changes an exposure time of the imaging element for a plurality of valid frames imaged by the imaging element for the plurality of spectral filters.

13. The imaging apparatus according to claim 1, further comprising an image processing unit that extracts a bright section and a dark section from a plurality of valid frames imaged by the imaging element for the plurality of spectral filters.

14. The imaging apparatus according to claim 1, wherein the multi-spectral filter has a disc shape in which the plurality of spectral filters is arranged in sequence on a plane of the disc in a rotation direction with the center of the disc as a rotation axis.

15. The imaging apparatus according to claim 14, wherein a frame rate F and an opening radius A of the imaging element, a radius W and a rotation speed R of the multi-spectral filter, the number N of the spectral filters included in the multi-spectral filter, a central angle θ with a peak on the center of the disc of the spectral filters, the ratio between a valid period D in which the image is determined as valid by the signal processing unit and an invalid period E in which the image is invalidated by the signal processing unit, and the number of frames f of the image taken in the valid period D are in relations described in equations (1) and (2) as follows:

[Mathematical Formula 1]

$$\theta = 2 \cdot \tan\left(\frac{E+D}{D} \cdot \frac{A}{W-A}\right) = \frac{2\pi}{N} \quad (1)$$

[Mathematical Formula 2]

$$f = \frac{F/R}{N} \cdot \frac{E}{E+D} \quad (2)$$

16. The imaging apparatus according to claim 1, wherein the plurality of spectral filters has a cylindrical shape in which the spectral filters are arranged in sequence on a side surface of the cylinder in a rotation direction with the center of the cylinder as a rotation axis.

17. The imaging apparatus according to claim 1, wherein the plurality of spectral filters has a rectangular shape in which the spectral filters are arranged in sequence on a plane of the narrow rectangle in a linear direction that reciprocates along a longitudinal side of the rectangle.

18. The imaging apparatus according to claim 1, wherein the drive unit drives the multi-spectral filter to switch continuously the spectral filters when images of light having passed through the plurality of optical filters are taken by the imaging element in a time-division manner.

19. The imaging apparatus according to claim 1, wherein the drive unit drives the multi-spectral filter to switch continuously the spectral filters at anytime or when the imaging element enters into the state that is capable of imaging.

20. An imaging method by an imaging apparatus including an imaging element that takes an image of a subject, a multi-spectral filter that has a plurality of spectral filters that disperses incident light on the imaging element by predetermined wavelength regions, and a drive unit that drives the multi-spectral filter without stopping the individual spectral filters and continuously switches the spectral filters to cover an opening in the imaging element, wherein the imaging method comprises the steps of:
    detecting whether a boundary between adjacent ones of the plurality of spectral filters included in the multi-spectral filter is in a position to block the opening in the imaging element; and
    performing signal processing for invalidating an image output from the imaging element in a period in which it is detected that the boundary between the spectral filters is in the position to block the opening in the imaging element.

* * * * *